Patented Oct. 15, 1940

2,217,836

UNITED STATES PATENT OFFICE 2,217,836

PREPARATION OF PHENOL

Alfred Dierichs, Leverkusen-Wiesdorf, Germany, assignor, by mesne assignments, to General Aniline & Film Corporation, New York, N. Y., a corporation of Delaware No Drawing. Application March 19, 1937, Serial No. 131,861. In Germany April 1, 1936

3 Claims. (Cl. 260—629)

The present invention relates to the preparation of phenol from halogen benzenes.

In the preparation of phenol the methods in current commercial use are those wherein chlorobenzene is hydrolyzed by means of a solution of an alkali metal or alkaline earth metal hydroxide. These processes are accompanied by several disadvantages chief among which is the formation of diphenyl ether. As diphenyl ether must be considered as a by-product it materially handicaps the commercial application of the process. It is, therefore, the object of my present invention to develop a process using alkaline earth metal hydroxide for the hydrolysis by which the formation of diphenyl ether is avoided to a far reaching extent.

I am aware of the co-pending application Ser. No. 95,848, filed August 13, 1936, to Herdieckerhoff now issued as U. S. Patent 2,085,429, dated June 29, 1937, which deals with the preparation of phenol from chloro-benzene by means of calcium hydroxide. As described in the earlier application the yield of diphenyl ether is decreased with the decrease of the amount of calcium hydroxide employed. In accordance therewith the process of the said earlier copending application is by causing calcium hydroxide to react in an aqueous medium upon chloro-benzene at a temperature about 300° C., the calcium hydroxide being employed in an amount of less than 1 mol per mol of chloro-benzene. Preferably about 0.6 mol of calcium hydroxide is employed per mol of chloro-benzene.

I have now found that in the hydrolysis of halogen benzenes by means of an aqueous solution of an alkaline earth metal hydroxide the yield of diphenyl ether is still further decreased when working in the presence of alkaline earth metal halides, particularly calcium chloride. Thereby the further advantage is involved that the reaction mixture needs not to be worked up wholly as the mother liquor due to its content of calcium chloride formed in the course of the reaction, can be employed directly for the next batch.

Another feature of my invention consists in the simultaneous addition of diphenyl ether to the reaction mixture prior to the starting of the reaction. As is known, this step exerts a favorable influence upon the production of phenol in case sodium hydroxide is employed for the hydrolysis; by the addition of diphenyl ether the effect is produced that the system is maintained in a state of balance with respect to such diphenyl ether and, in consequence thereof, the yield of phenol is increased. It was very surprising to note that in case of alkaline earth metal hydroxides the the reintroduction of diphenyl ether into the system was not capable of materially increasing the yield of phenol. On the other hand, when working according to my invention, viz. in the presence of alkaline earth metal hydroxides and alkaline earth metal halides the addition of diphenyl ether to the system has nearly the same effect upon the yield of phenol as is the case when working with sodium hydroxide.

It is to be understood that I prefer to work within the temperature conditions and within the proportions specified in the above mentioned earlier co-pending application.

The following examples illustrate the invention without, however, restricting it thereto:

Example 1

2 mols of chlorobenzene and 1.1 mols of lime suspended in 1 liter of water are caused to react with each other in the presence of 150 grams of barium chloride and a copper catalyst. In a yield of 96–97% a reaction product is obtained which contains 20 grams of diphenyl ether per 100 grams of phenol. Without the addition of barium chloride, however, a reaction product is obtained which contains 25 grams of diphenyl ether per 100 grams of phenol when working under the same conditions.

Example 2

2 mols of bromobenzene and 1.1 mols of lime suspended in 1 liter of water are caused to react with each other in the presence of 50 grams of calcium chloride and a copper catalyst. In a yield of 96–97% a reaction product is obtained which contains 15 grams of diphenyl ether per 100 grams of phenol. Without using calcium chloride, however, a reaction product is obtained which contains 24 grams of diphenyl ether per 100 grams of phenol.

Example 3

2 mols of chlorobenzene, 1.1 mols of lime suspended in 1 liter of water are heated with 150 grams of calcium chloride. A reaction product which contains 16 grams of diphenyl ether per 100 grams of phenol is obtained in a yield of 96–97%.

Without adding calcium chloride a reaction product is obtained which contains 25 grams of diphenyl ether per 100 grams of phenol under the same working conditions.

Example 4

1 mol of chlorobenzene, 0.55 mol of lime suspended in 1 liter of water are heated with 150 grams of calcium chloride and a copper catalyst. In a yield of 96-97% a reaction product which contains 10 grams of diphenyl ether per 100 grams of phenol is obtained.

When adding diphenyl ether a reaction product is obtained which contains 7 grams of diphenyl ether per 100 grams of phenol in a nearly quantitative yield.

When working under the same conditions, however, without adding calcium chloride respectively calcium chloride and diphenyl ether a reaction product is obtained which contains 17 grams of diphenyl ether per 100 grams of phenol.

I claim:

1. In a process for the manufacture of phenol by hydrolyzing a halogen benzene by means of calcium hydroxide in the presence of water the step which comprises adding to the reaction mixture an alkaline earth metal halide selected from the group consisting of calcium chloride and barium chloride in an amount of at least 0.4 mol per mol of calcium hydroxide.

2. The process as claimed in claim 1, wherein the temperature is kept about 300° C.

3. The process as claimed in claim 1, wherein the calcium hydroxide is employed in an amount of less than 1 mol per mol of halogen benzene.

ALFRED DIERICHS.